(12) United States Patent
Baran

(10) Patent No.: US 8,195,679 B2
(45) Date of Patent: Jun. 5, 2012

(54) ASSOCIATING DESCRIPTIVE CONTENT WITH ASSET METADATA OBJECTS

(75) Inventor: Dan Baran, Mill Valley, CA (US)

(73) Assignee: CBS Interactive Inc., San Francisco, CA (US)

(*) Notice: Subject to any disclaimer, the term of this patent is extended or adjusted under 35 U.S.C. 154(b) by 102 days.

(21) Appl. No.: 12/168,535

(22) Filed: Jul. 7, 2008

(65) Prior Publication Data

US 2010/0131524 A1    May 27, 2010

(51) Int. Cl.
*G06F 7/00* (2006.01)
*G06F 17/30* (2006.01)

(52) U.S. Cl. ....................................... 707/758

(58) Field of Classification Search .............. 707/758
See application file for complete search history.

(56) References Cited

U.S. PATENT DOCUMENTS

| | | | |
|---|---|---|---|
| 6,983,287 B1* | 1/2006 | Jayanti et al. | 1/1 |
| 2003/0004942 A1* | 1/2003 | Bird | 707/3 |
| 2005/0222987 A1* | 10/2005 | Vadon | 707/3 |
| 2006/0167903 A1* | 7/2006 | Smith et al. | 707/100 |
| 2007/0174340 A1 | 7/2007 | Gross | |
| 2007/0271330 A1 | 11/2007 | Mattox et al. | |
| 2008/0154847 A1 | 6/2008 | Chellapilla et al. | |
| 2008/0243820 A1 | 10/2008 | Chang et al. | |
| 2010/0279667 A1 | 11/2010 | Wehrs et al. | |
| 2010/0281041 A1 | 11/2010 | Almeida | |
| 2010/0324991 A1 | 12/2010 | Colledge et al. | |
| 2011/0055195 A1 | 3/2011 | Reitter et al. | |
| 2011/0145066 A1 | 6/2011 | Law et al. | |

* cited by examiner

*Primary Examiner* — Greta Robinson
*Assistant Examiner* — Jeffrey Chang
(74) *Attorney, Agent, or Firm* — Zurvan Mahamedi, Esq.; Mahamedi Paradice Kreisman LLP

(57) ABSTRACT

Methods are provided, including a method of associating descriptive content with a set of assets. The method includes determining an asset metadata object, determining descriptive content related to the asset metadata object, and associating the descriptive content with the asset metadata object.

10 Claims, 6 Drawing Sheets

ASSOCIATING DESCRIPTIVE CONTENT WITH ASSET METADATA OBJECTS

BACKGROUND

1. Field

Embodiments of the present invention relate generally to descriptive content or information relevant to multiple assets (e.g., products) and, more particularly, to associating descriptive content with sets of assets through metadata objects.

2. Description of the Related Art

Online reviews (e.g., product reviews) and other descriptions are known in the art. For example, on line catalogs and store fronts may have descriptive content to assist the buyer in finding or purchasing assets. Such descriptions often contain information that may be considered asset specific information or descriptive content that may relate to multiple assets. For example, a notebook computer model number is asset specific information, while information regarding the category of notebook computers into which the current notebook computer is categorized, such as "Ultra Portable", is descriptive content relevant to multiple assets (in this example, notebook computers in said category). Conventional methods of displaying descriptive content relevant to particular assets involve mapping descriptive content directly to a particular asset. FIG. 1 is a schematic representation of a conventional relationship 100 between descriptive content and a particular asset according to such a conventional method. A content ID 102 is mapped directly to an asset ID 104. Such an approach may limit the scalability of the descriptive content, since the descriptive content often may apply to similar assets that may exist in the same database at the same time, or that may come into existence after the descriptive content has been published.

BRIEF SUMMARY

One aspect of the invention is a method of associating descriptive content with a set of assets based upon a specification of the set of assets, including determining an asset metadata object based on an asset specification, determining descriptive content related to the asset metadata object, and associating the descriptive content with the asset metadata object.

Another aspect is a method of displaying asset information including a set of assets and descriptive content relating to the assets, including receiving attributes of an asset to create and asset specification, determining a metadata object based on the asset specification, displaying a set of assets corresponding to the asset specification, and displaying descriptive content associated with the metadata object.

Another aspect is a method of presenting electronic product catalog information to a user, the catalog information including products in a category and descriptive content related to the category, including presenting catalog information to a user, receiving product attributes related to desired products from the user, creating an asset specification based on the product attributes, determining a metadata object based on the asset specification, said metadata object corresponding to a product category, displaying information relating to products corresponding to the product attributes and information associated with the metadata object that is descriptive of the product category.

The foregoing and other aspects will become apparent from the following detailed description when considered in conjunction with the accompanying drawing figures.

DETAILED DESCRIPTION

Figure 1:
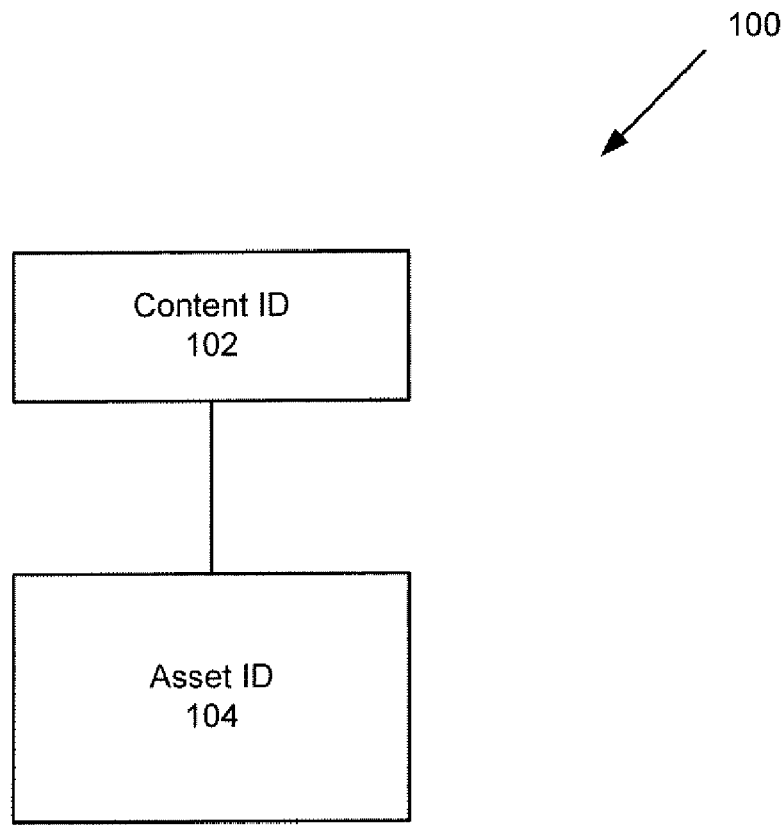
FIG. 1 is a schematic representation of a conventional relationship between descriptive content and a particular asset according to a conventional method.

Reference will now be made in detail to embodiments of the present invention, examples of which are illustrated in the accompanying drawings, wherein like reference numerals refer to the like elements throughout. The embodiments are described below to explain the present invention by referring to the figures.

As used in this application, the terms "a", "an" and "the" may refer to one or more than one of an item. The terms "and" and "or" may be used in the conjunctive or disjunctive sense and will generally be understood to be equivalent to "and/or". For brevity and clarity, a particular quantity of an item may be described or shown while the actual quantity of the item may differ.

In a content-oriented website, such as an on-line product catalog, that may utilize a normalized navigation framework (e.g., an ontology or attribute filters), there may be conceptual alignment between the ideas that may be addressed in the subsections of narrative content (e.g., video, reviews, and features), and the navigational "nodes" that users may pass through. By recognizing this alignment, embodiments of the present invention enable the scalability of descriptive content.

As noted above, mapping descriptive content directly to particular assets may limit the scalability of the descriptive content. Embodiments of the present invention improve on conventional methods of displaying descriptive content relevant to particular assets by utilizing asset metadata defined by an asset specification. Asset metadata may include terms or features related to or appearing in the asset. Embodiments of the present invention improve on conventional methods by acknowledging the fact that asset metadata may be conceptually aligned with particular blocks of descriptive content (e.g., a paragraph describing an idea). The particular blocks of descriptive content may be mapped to asset metadata objects which in turn may be mapped to as et of assets, thereby automatically publishing the blocks of descriptive content to multiple related assets.

Figure 2:
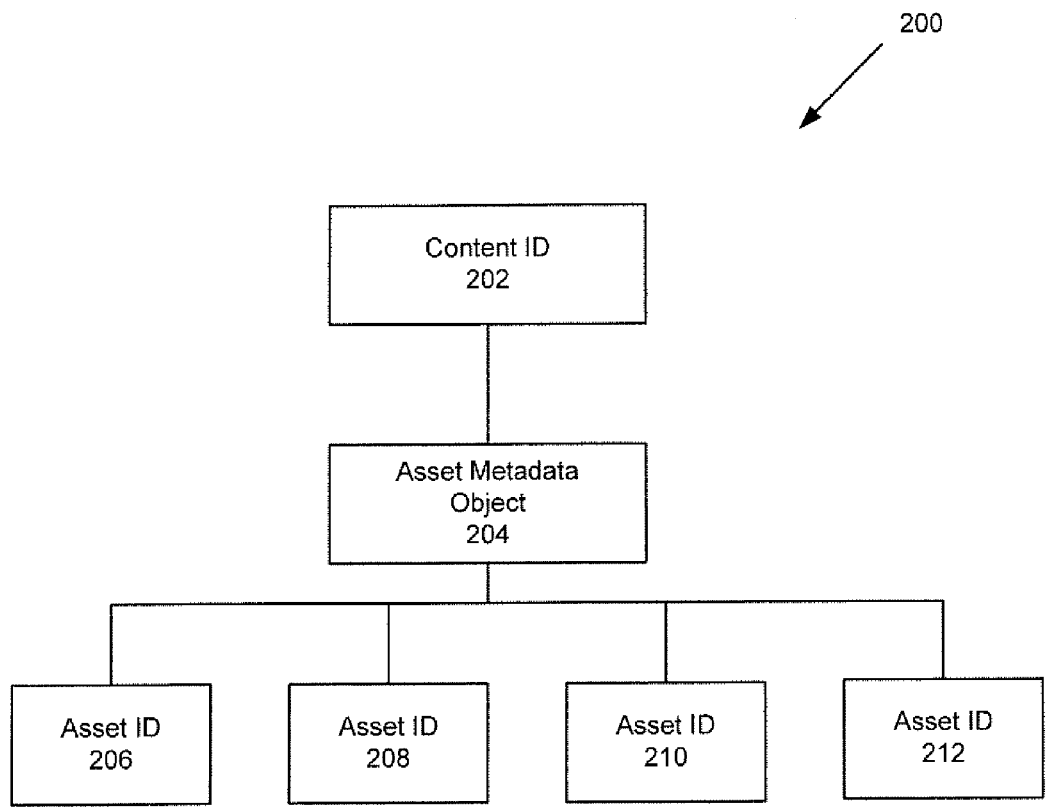
FIG. 2 is a schematic representation of a relationship between descriptive content, an asset metadata object, and a set of assets according to an embodiment of the present invention.

FIG. 2 is a schematic representation of a relationship 200 between descriptive content, an asset metadata object, and a set of assets according to an embodiment of the present invention. In FIG. 2, descriptive content may be identified by a content ID 202. Instead of mapping descriptive content directly to particular assets, the content ID may be mapped to the asset metadata object 204. The asset metadata object 204 is mapped to, i.e. associated with, a set of assets (asset IDs 206, 208, 210, 212) corresponding to the metadata object.

The descriptive content may describe concepts that may relate to multiple assets, of course. The descriptive content may describe concepts that are similar to concepts described in, for example, online product buying guides or online catalogs. For example, the descriptive content information may describe a category of assets. For example, with respect to ultraportable notebook computers, the descriptive content may read: "The smallest, most lightweight laptops are called ultraportables. Their compact form factor is crucial for people who need to have their PC with them all the time, especially business travelers." This descriptive content may apply to all ultraportable notebook computers that may now exist in the database, or that may come into existence after the descriptive content has been published.

The asset metadata object 204 may be defined by an asset filter specification associated with asset metadata including terms or features related to or appearing in assets. The asset metadata object 204 may relate to a particular concept. Asset metadata may include various attributes such as brands, prices, technologies, and other factors. For example, metadata for a Toshiba® ultraportable notebook computer having an Intel® processor may include the following terms as metadata: "ultraportable"; "notebook"; "computer"; "processor"; "Toshiba®"; and "Intel®."

The assets may include products. The asset IDs 206, 208, 210, 212 may refer to specific products. For example, asset ID 206 may refer to ultraportable notebook # 1, asset ID 208 may refer to ultraportable notebook # 2, and so on in like manner for asset IDs 210, 212.

Figure 3:
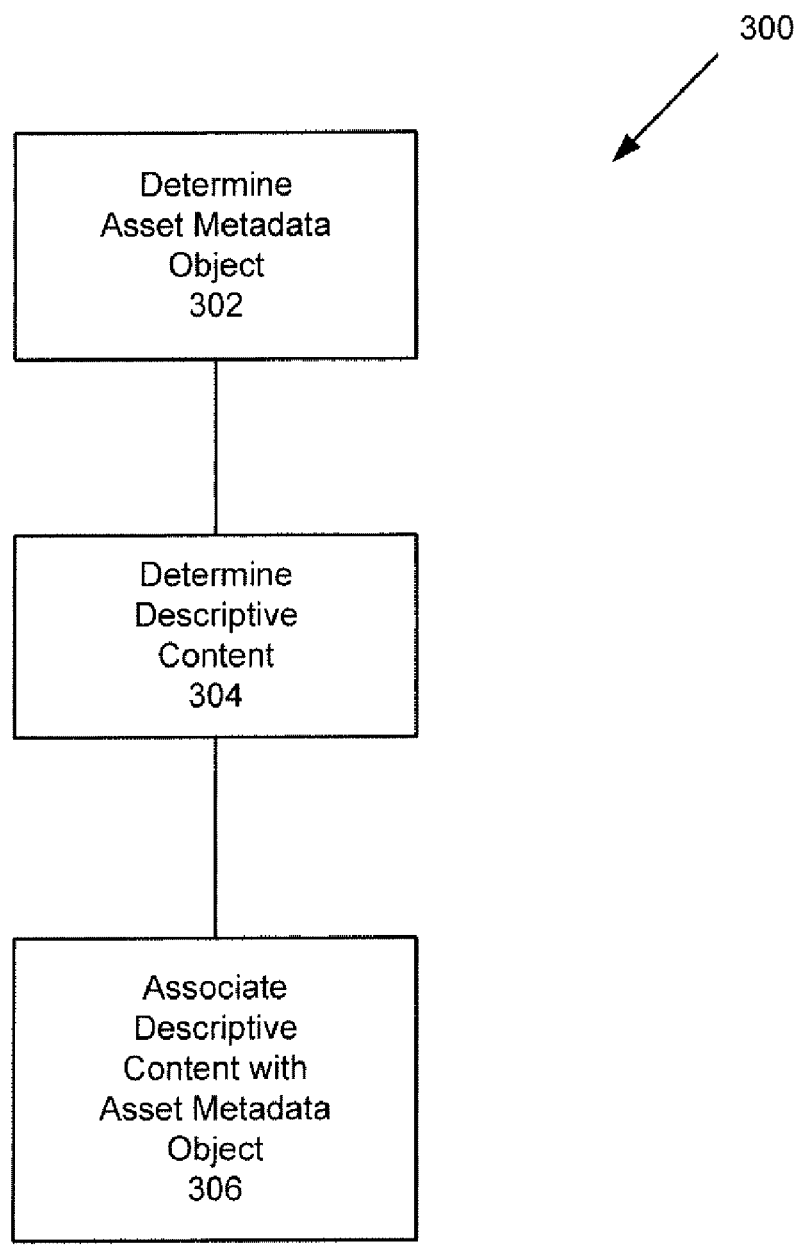
FIG. 3 is a schematic representation of a method of associating descriptive content with a plurality of assets according to an embodiment of the present invention.
Figure 4:
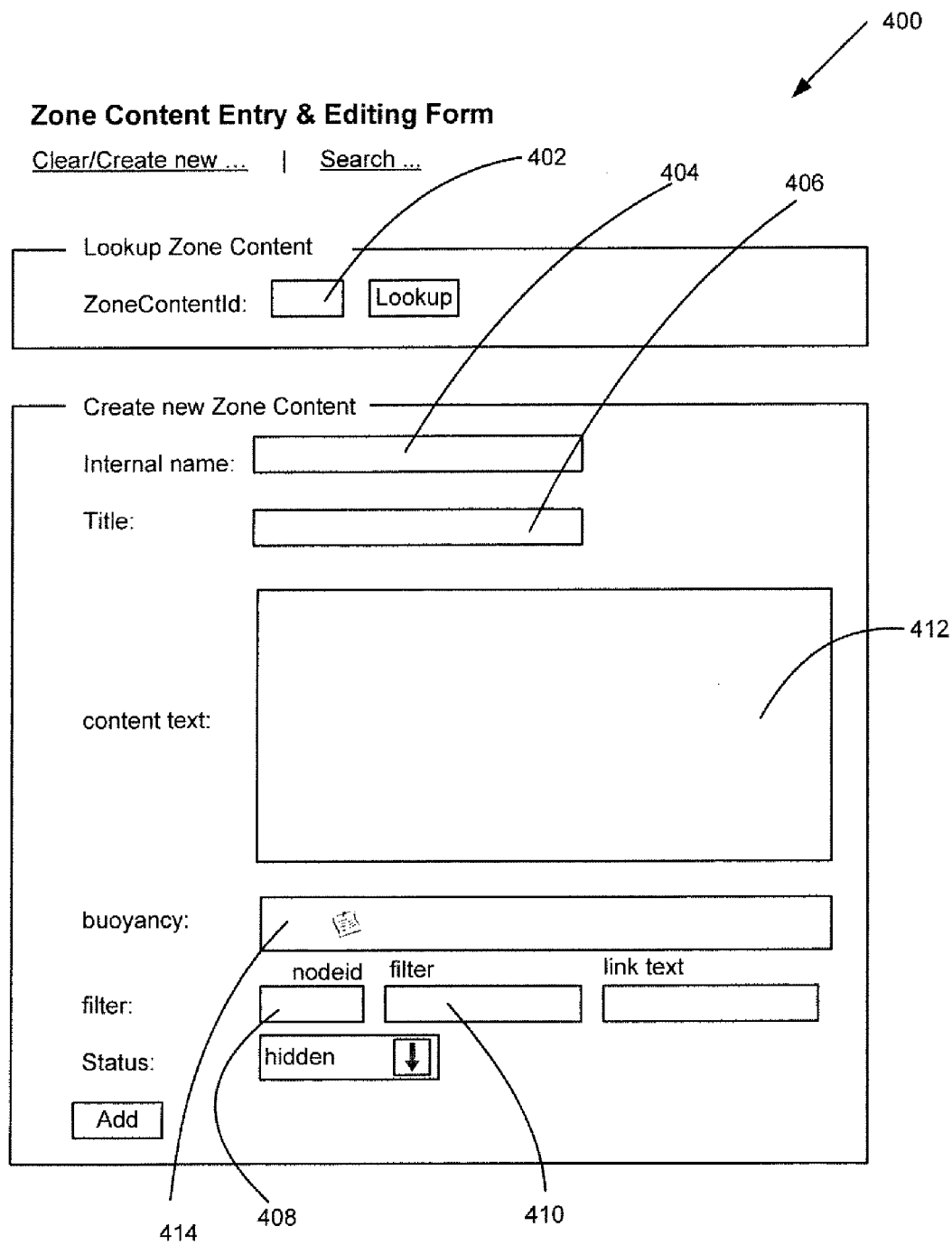
FIG. 4 is a screen shot of a descriptive content association tool according to an embodiment of the present invention.

The association of descriptive content with a set of assets is now described with reference to FIGS. 3 and 4. FIG. 3 is a schematic representation of a method 300 of associating descriptive content with a set of assets according to an embodiment of the present invention. FIG. 4 is a screen shot 400 of a descriptive content association tool according to an embodiment of the present invention.

In operation 302, an asset metadata object 204 may determined. The asset metadata object 204 may be assigned identifying information, such as through an identifier entry field 402, a name entry field 404, and a title entry field 406. The identifying information may be entered, or may be inferred. For example, a title may be inferred from an asset filter specification.

The asset metadata object 204 may be defined by one or more asset filter specifications. In other words, specific asset filter specifications may be associated with the asset metadata object 204. The asset filter specifications may be stored as a string, or by an ID. The descriptive content associated with the asset metadata object 204 may only appear for assets meeting the specific asset filter specification. For example, the asset metadata object 204 may include an asset filter specification "ultraportable." The asset specification can include any product attributes that can be used to select products, such as brand, price range, memory capacity, or the like. The descriptive content associated with the asset metadata object may only appear for assets meeting the asset filter specification "ultraportable." An asset filter specification may be entered into a filter input field 410. Any type of filter specification can be used, as is well known. For example, the Dynamic Filter Link Lists (DFLL) methodology used by CNET.com can be used.

In operation 304, descriptive content related to the asset metadata object 204 may be determined. As noted above, the descriptive content may describe concepts that may relate to multiple assets. The descriptive content may describe concepts that are similar to concepts described in, for example, online product buying guides. The descriptive content may be entered manually into a content entry field 412 or otherwise entered. The descriptive content may include text, graphs, and hyperlinks. The descriptive content entry field 412 may accept bulk HTML.

The asset metadata object 204 may be defined by specifications for which attribute values associated with the descriptive content should be displayed as, for example, inline buying advice. In other words, object 204 could be used to surface more information about a specific attribute value. For example, the attribute value "Intel Core 2 Duo" could be associated to information about, say, where Core 2 duo fits in Intel's line of processors. The specifications may be entered through a node ID entry field 408, attribute ID entry field (not shown) and a value ID entry field (not shown). Descriptive content may display for assets having a node matching the entered node ID. Descriptive content may display for values corresponding to the entered attribute ID. Descriptive content may be associated with an entered value. If a value group ID is entered, the descriptive content may display with any value in the group. If no value ID is specified, the descriptive content may be associated with the with the attribute itself. The asset specification can be entered in any manner that defines a set of assets for which a metadata object corresponding to the assets can be created.

A descriptive content buoyancy (e.g., a subjective measure of the descriptive content's "importance") may be associated with the descriptive content. The descriptive content buoyancy may be entered into a buoyancy entry field 414. The descriptive content buoyancy may be used to determine whether or not to display particular descriptive content if, for example, an asset has more descriptive content than may fit onto a page displaying asset information.

In operation 306, the descriptive content may be associated with the asset metadata object 204. The descriptive content may be associated with the asset metadata object 204 by creating an object storing the above information (e.g., asset filter specification and descriptive content). The object may be plain text, HTML, or any other appropriate object.

Figure 5:
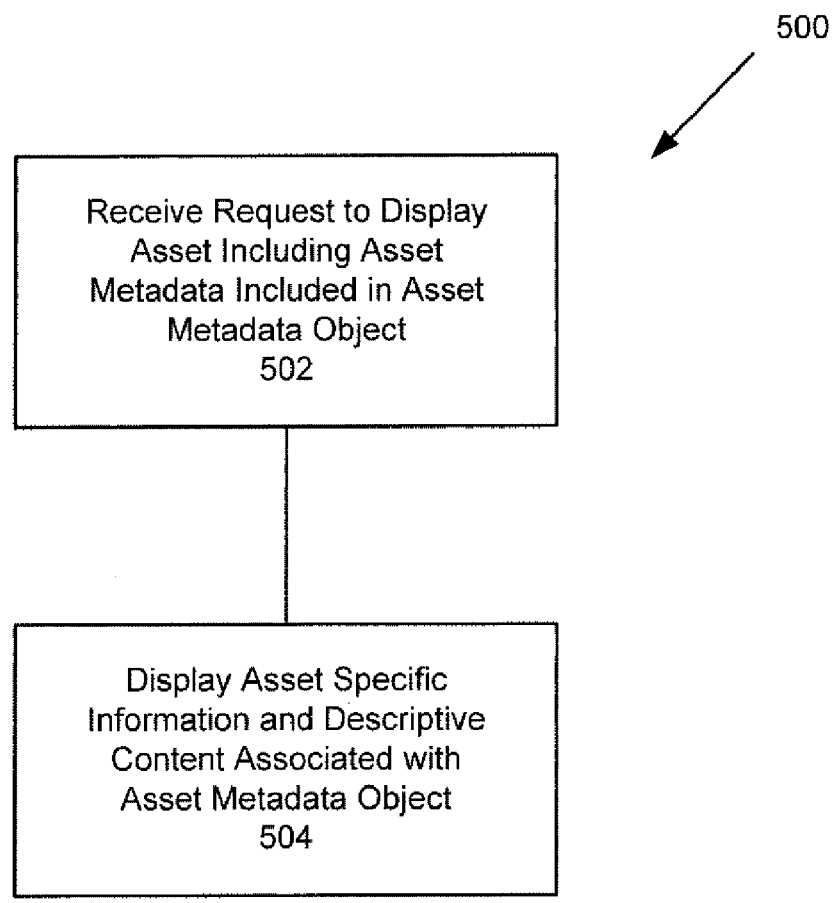
FIG. 5 is a schematic representation of a method 500 of displaying asset information including descriptive content according to an embodiment of the present invention.
Figure 6:
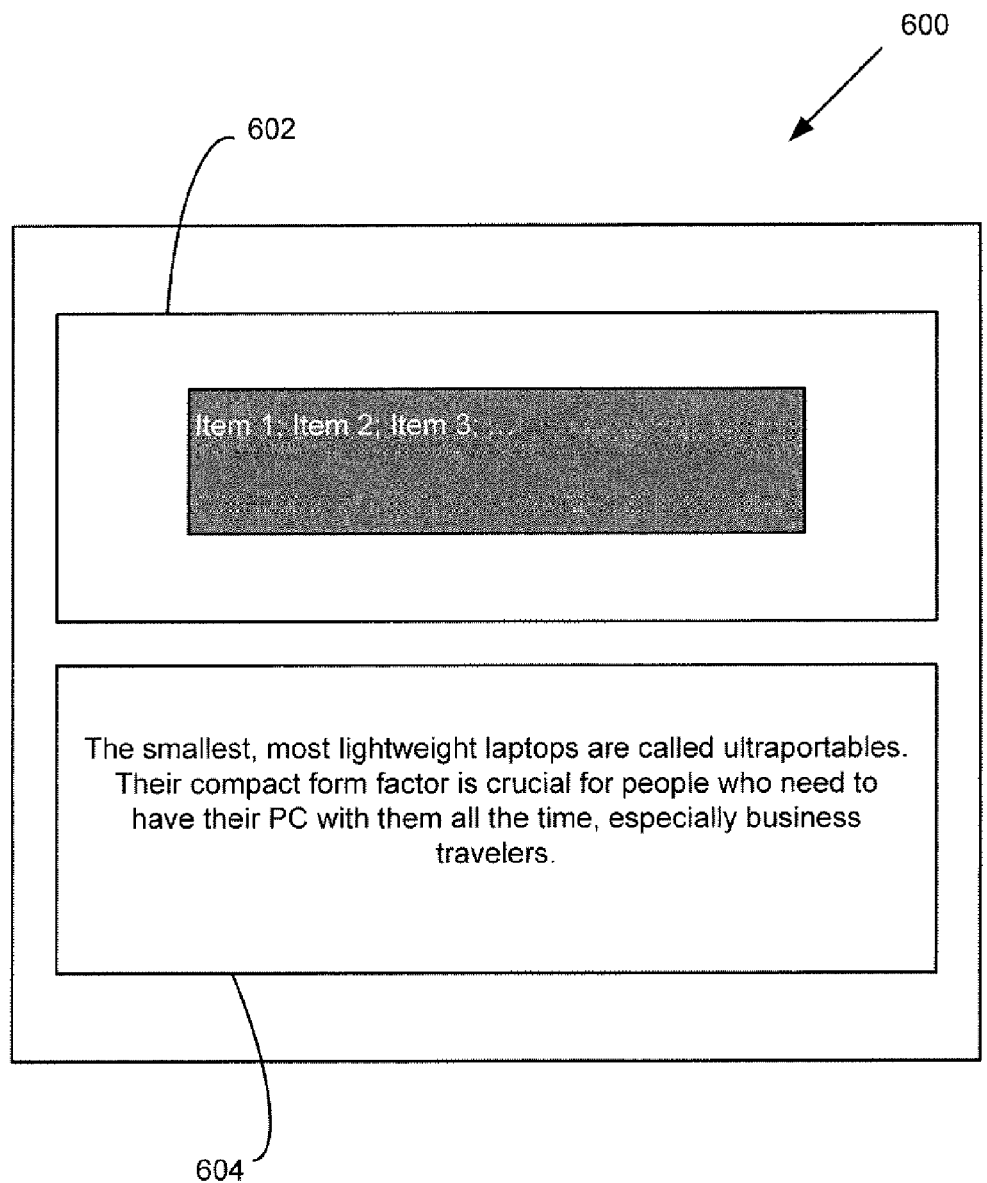
FIG. 6 is a schematic representation of a display including asset information according to an embodiment of the present invention.

The presentation of asset information including descriptive content is described with reference to FIGS. 5 and 6. FIG. 5 is a schematic representation of a method 500 of displaying asset information including descriptive content according to an embodiment of the present invention. FIG. 6 is a schematic representation of a display 600 including asset information according to an embodiment of the present invention.

In operation 502, a request to display a set of assets may be received. The assets may be identified by asset IDs 206. The asset specified in the request may include asset metadata. That metadata may be associated with an asset metadata object 204.

In operation 504, asset information relating to the request may be displayed on a display 600. The asset information may include asset specific information 602 and descriptive content 604. The displayed descriptive content 604 may be the same descriptive content entered into the content entry field 412. The displayed descriptive content may be called using an asset filter specification URL that was used to display asset information 602. In other words, the asset filter specification may be used to surface content on the display 600. Additionally, the asset filter specification may be used in reverse to link specifications back to the asset filter specification.

As an example, the descriptive content can be displayed along with information relating to a set of assets when the assets are displayed in response to navigation to a node of a catalog or in response to filter criteria or in response to specifying desirable asset attributes. The descriptive content may be displayed on the display as inline buying advice, or with a specific asset. The descriptive content may be displayed in order of descriptive content buoyancy. The asset specification can be used to define the display of asset information.

As an example of use of the preferred embodiment, assume a user is trying to find a lightweight laptop computer using an online catalog. The user may select a price range ($1000 to $2000), and a weight (under 5 lbs.), as well as other product attributes, such as memory capacity, screen resolution, and the like. The attributes define a product specification for a set of products (all laptops currently in the catalog that are under 5 lbs. and in the price range of $1000 to $2000). A metadata object can be created that is a string of the attributes [price: $1000-$2000; weight: <5 lbs.]. A database storing metadata objects and associated descriptive content can then be queried to find a metadata object that matches or is similar to the metadata object created from the asset specification. The result of the search query can be used to locate the descriptive content. The descriptive content can then be displayed with the product information for each product in the set of products. In this manner, the set of products fitting the users needs is displayed along with, for example, a general description of the set of products and things to consider when selecting one product form the set.

Although embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method for delivering descriptive content, the method being implemented by one or more processors and comprising:
    receiving a selection of one or more attributes that are descriptive of a subset of assets in a set of plural assets;
    determining an asset specification that is based on the selection of attributes, the asset specification being common to the subset of assets;
    identifying a plurality of metadata objects that are each associated with (i) the asset specification, (ii) a descriptive content, having a size, that is distinct from the asset specification and the metadata object itself, and (iii) a buoyancy;
    selecting, from the plurality of metadata objects that are associated with the asset specification, at least one metadata object, based at least in part on the size of the descriptive content and the buoyancy;
    providing the descriptive content of the selected metadata object for display on a display device in connection with information about at least one asset from the subset of assets.

2. The method of claim 1, wherein the asset specification relates to at least one of the attributes of the selection corresponding to an asset brand, an asset price, or an asset technology.

3. The method of claim 1, wherein the asset specification comprises a filter string identifying one or more attributes of the selection.

4. The method of claim 1, wherein the descriptive content comprises information relating to the selection of one or more attributes common to the subset of assets.

5. The method of claim 1, wherein the descriptive content comprises information relating to a category of assets.

6. The method of claim 1, wherein said receiving is in response to a user input corresponding to one or more attributes.

7. The method of claim 1, wherein the asset metadata object is one of a plain text object and an HTML object.

8. The method of claim 1, further comprising providing catalog information for display on a display device.

9. The method of claim 1, wherein said receiving comprises receiving attributes corresponding to a catalog node in an on-line catalog.

10. The method of claim 1, wherein said receiving comprises receiving attributes selected by a user using a form.

* * * * *

UNITED STATES PATENT AND TRADEMARK OFFICE
CERTIFICATE OF CORRECTION

PATENT NO. : 8,195,679 B2  
APPLICATION NO. : 12/168535  
DATED : June 5, 2012  
INVENTOR(S) : Daniel R. Baran Page 1 of 1

It is certified that error appears in the above-identified patent and that said Letters Patent is hereby corrected as shown below:

Title Page, item (75), should read:

(75) Inventor: Daniel R. Baran, Mill Valley, CA (US)

Signed and Sealed this
First Day of March, 2016

Michelle K. Lee
*Director of the United States Patent and Trademark Office*